US005975496A

United States Patent [19]
Hong et al.

[11] Patent Number: 5,975,496

[45] Date of Patent: Nov. 2, 1999

[54] MULTIPLE PUMP TRANSMISSION JACK

[75] Inventors: Wen-cheng Hong; Jiun-hong Lin, both of Chia-yi, Taiwan

[73] Assignee: Norco Industries, Inc., Compton, Calif.

[21] Appl. No.: 09/086,895

[22] Filed: May 29, 1998

[51] Int. Cl.$^6$ .......... B60P 1/00

[52] U.S. Cl. .......... 254/2 R; 60/486

[58] Field of Search .......... 60/486; 254/93 R, 254/93 H, 2 R, 2 B, 8 R, 8 B

[56] References Cited

U.S. PATENT DOCUMENTS

| | | | |
|---|---|---|---|
| 2,549,862 | 4/1951 | Thorndike . | |
| 2,654,568 | 10/1953 | Pine . | |
| 2,664,073 | 12/1953 | Pine . | |
| 3,121,556 | 2/1964 | Faulkner | 254/2 R |
| 4,865,293 | 9/1989 | Ishi et al. | 254/2 R |
| 4,867,416 | 9/1989 | Garrett et al | 254/2 R |
| 5,156,375 | 10/1992 | Liegel et al. . | |

OTHER PUBLICATIONS

Product Catalog entitled: "Norco Professional Lifting Equipment"; dated Oct., 1997; published by Norco industries, Inc., Compton CA; front cover, p. 15 and back cover.

*Primary Examiner*—Robert C. Watson
*Attorney, Agent, or Firm*—Oldham & Oldham Co., L.P.A.

[57] ABSTRACT

The present invention is a multiple pump transmission jack for use with removing and repairing transmissions. The jack has two hydraulic pumps mounted on a base which are connected with interrelated oil passages or conduits formed within the base, which is operated by a pedal connected with the two pumps for drawing hydraulic oil from a reservoir and into an oil pressure cylinder to easily and quickly raise a piston rod within the oil pressure cylinder saving the operator's effort and increasing the efficiency of operation. The jack also includes an overload system that prevents the operator from placing a load on the jack which is greater than its rated load, thus preventing danger.

6 Claims, 5 Drawing Sheets

MULTIPLE PUMP TRANSMISSION JACK

FIELD OF THE INVENTION

This invention relates generally to a jack for lifting a transmission, and specifically to one having multiple pumps for pumping hydraulic oil into a hydraulic cylinder so as to force a piston rod within the hydraulic cylinder to be raised at a faster rate.

BACKGROUND OF THE INVENTION

In maintenance or repair of an automobile transmission, a vehicle hoist is used to raise the automobile from the ground and then a jack is used to support and raise or lower the transmission as necessary when removing or installing the vehicle's transmission. A conventional transmission jack as is known in the prior art is seen generally at 100 in FIG. 1. This conventional transmission jack has a base 102, a hydraulic cylinder 112, a pump 104 mounted to the base 102 which is operated by a pedal 106. Optionally, legs 108 and castors 110 can be attached to the base 102.

As is seen in FIG. 2, the hydraulic cylinder device 112 has an oil pressure cylinder 116 and a reservoir 118. The oil pressure cylinder 116 has a piston rod 114, to which a bracket is affixed at the upper end of the piston rod 114 to accept a transmission. The pump 104 is connected to the reservoir 118 by way of an oil withdrawing conduit 120 provided within the base 102. The oil pressure cylinder 116 is connected to the oil withdrawing conduit 120 by way of oil exit conduit 124.

Referring to FIG. 3, a check valve 136 is shown. An oil pressure release conduit 128 is provided above for connecting the oil exit route 124 and the reservoir 118. Pressure release valve 126 is installed for controlling the release volume. Further, an overload conduit 122, is used to connect reservoir 118 and the oil exit conduit 124 and is controlled by a safety valve 130.

In operation, an operator repeatedly steps on the pedal 106 of the pump 104, forcing the oil in the reservoir 118 to flow through the oil withdrawing conduit 120, through the oil exit conduit 124 and then into the oil pressure cylinder 116 of the oil cylinder 112 to raise the piston rod 114. In order to lower the piston rod 114 of oil cylinder 112 the oil release valve 126 is used to connect the oil release conduit 128 with the oil exit conduit 124 allowing the oil in the oil pressure cylinder 116 to return to the reservoir 118 so that the piston rod 114 is lowered to its original position. In the event that the load is beyond its rated load, oil delivered by stepping on the pedal 106 cannot be pumped out through the oil exit conduit 124, but pushes upon the check valve 132 in the overload conduit 122 and flows back to the reservoir 118 thus not allowing the operator to overload the jack and avoiding danger.

However, conventional transmission jacks as described above have been found to have problems in that the time taken to raise a single pump transmission jack through depressing the pedal was too long and the operator would fatigue and be unable to operate effectively. The transmission jack of the present invention remedies this problem by incorporating two pumps into a transmission jack which increases the amount of oil that is drawn out of the reservoir and pumped into the oil pressure cylinder to raise the piston rod and in turn the transmission at a faster rate.

SUMMARY OF THE INVENTION

The preferred embodiment of the transmission jack of the present invention takes the form of a jack having two pumps that draw hydraulic oil through interrelated oil passages or conduits from a reservoir surrounding the hydraulic cylinder and pumps the oil into an oil pressure cylinder and displaces, and therefore raises a piston rod. Further, there is an overload system that serves two purposes in the operation of the jack of the present invention. The principal purpose of the overload system is to prevent the operator from placing a load on the jack which is greater than the overall rated load for the jack. A secondary purpose of the overload system is to allow the pump operator to control to a reasonable level the pumping effort needed to raise a load. Achieving this secondary purpose is desirable because a single pump piston must be designed proportionate to the pressure cylinder with which it will work. Additionally, a single pump piston must be designed not only so that it will be capable of raising the piston rod and the load in a reasonable time, but also so that it will raise a transmission without unduly tiring the operator. While providing dual pump pistons to the jack of the present invention would permit the piston rod and the load to be raised faster, it would ordinarily require that the operator exert considerably more force to push down on the pedal used to simultaneously operate both pump pistons. Recognizing, however, that most automotive transmissions weigh approximately 350 pounds or less and that most conventional transmission jacks are rated to raise loads up to a maximum of 1000 pounds, the overload system of the present invention may be configured so that each pump piston is linked to separate, adjustable check valves that will permit both pump pistons to direct hydraulic oil to the oil pressure cylinder when the load being raised is comparable to or somewhat above that which is commonly experienced for transmissions and that will permit only one pump piston to supply hydraulic oil to the oil pressure cylinder when the load to be raised exceeds the commonly experienced level but is less that the overall rated maximum capacity of the jack. Configuring the overload system in this manner results in the jack being operable with two piston pumps at increased lifting speed and with reasonable pumping effort at loads most frequently encountered during transmission work. The configuration also results in continued reasonable pumping effort, but reduced lifting speed, at higher loads when only one piston pump is operable. When the operator wants to lower the jack, a release conduit controlled by a release valve allows fluid in the oil pressure cylinder to flow back to the reservoir, allowing the piston rod to lower to its original position. A bracket, such as are known in the art, is attached to the external end of the piston rod to accept and retain the transmission. Optionally, legs can be attached to the sides of the base of the jack to add stability and castors can be attached to the legs to allow the jack to be mobile.

It is therefore an object of the present invention to quickly and easily raise a transmission for repair or replacement while saving the operators effort and increasing the efficiency of operation.

It is further an object of the present invention to provide a transmission jack that will not accept a load over its load rating increasing the safety of the operator.

DETAILED DESCRIPTION OF THE PREFERRED EMBODIMENT

Reference will now be made in detail to the present preferred embodiments of the present invention, examples of which are illustrated in the accompanying drawings. Whenever possible, the same reference numbers will be used throughout the drawings to refer to the same or like parts.

Figure 2:
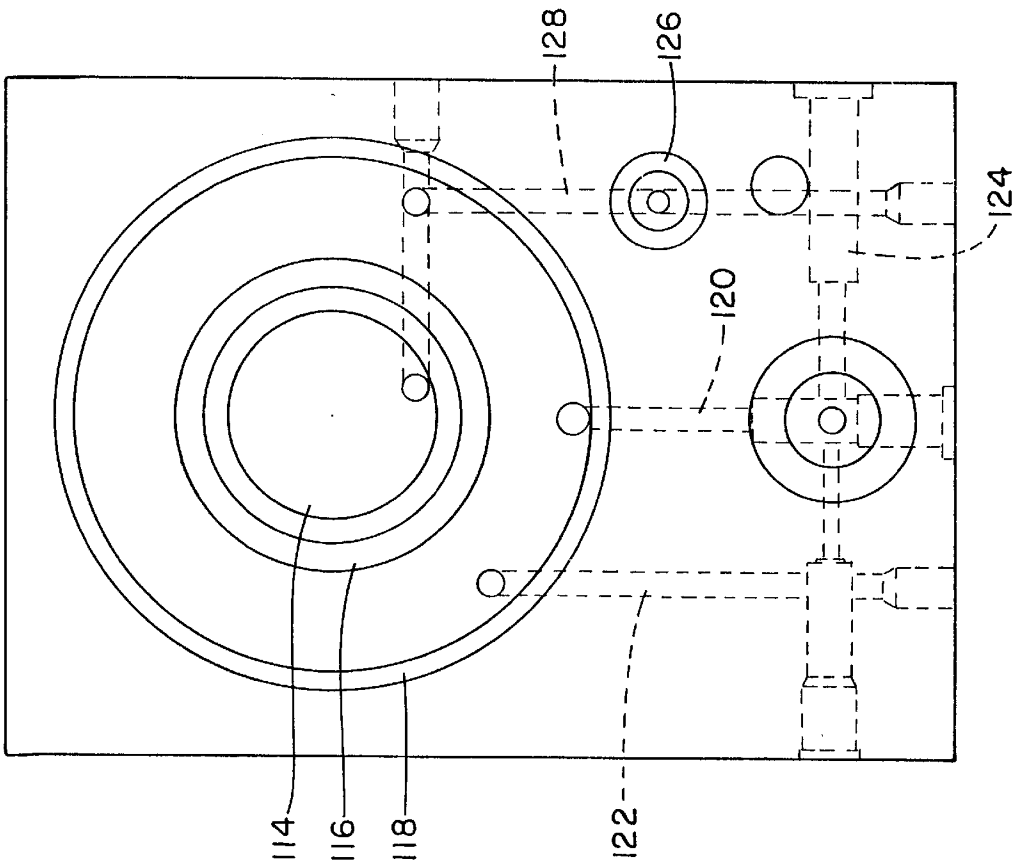
FIG.-2 Prior Art
FIG. 2 is a top view of the base of a conventional jack for lifting an automobile transmission.
Figure 1:
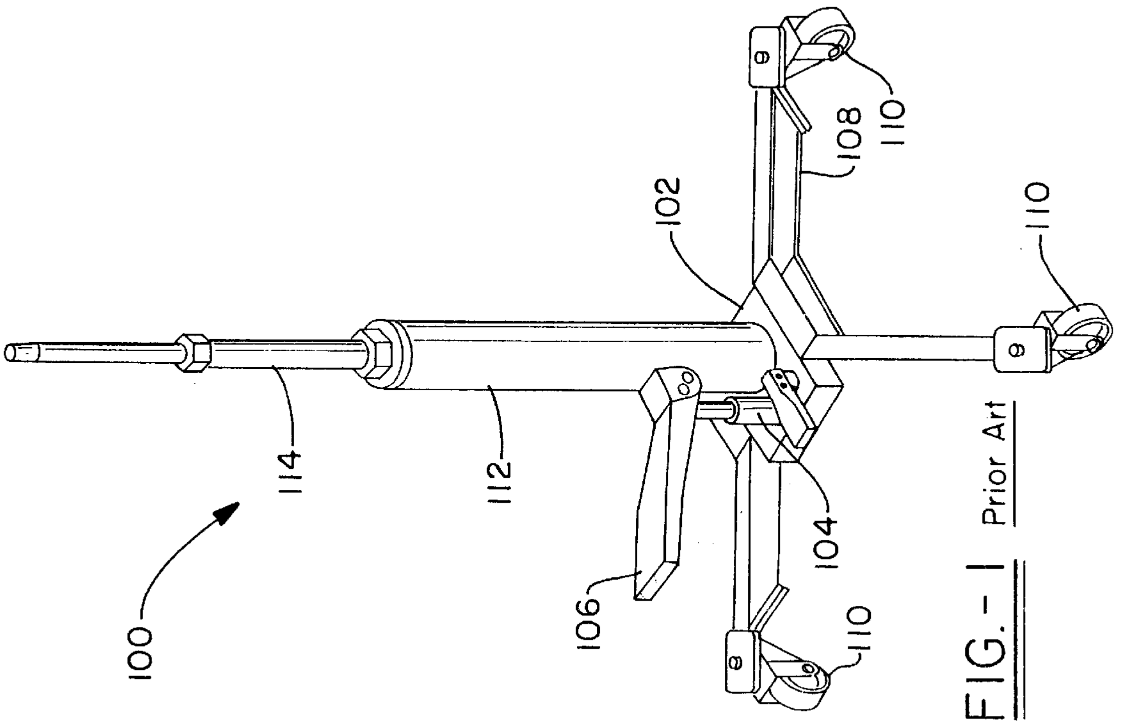
FIG.-1 Prior Art
FIG. 1 is a perspective view of a conventional jack for lifting an automobile transmission.
Figure 4:
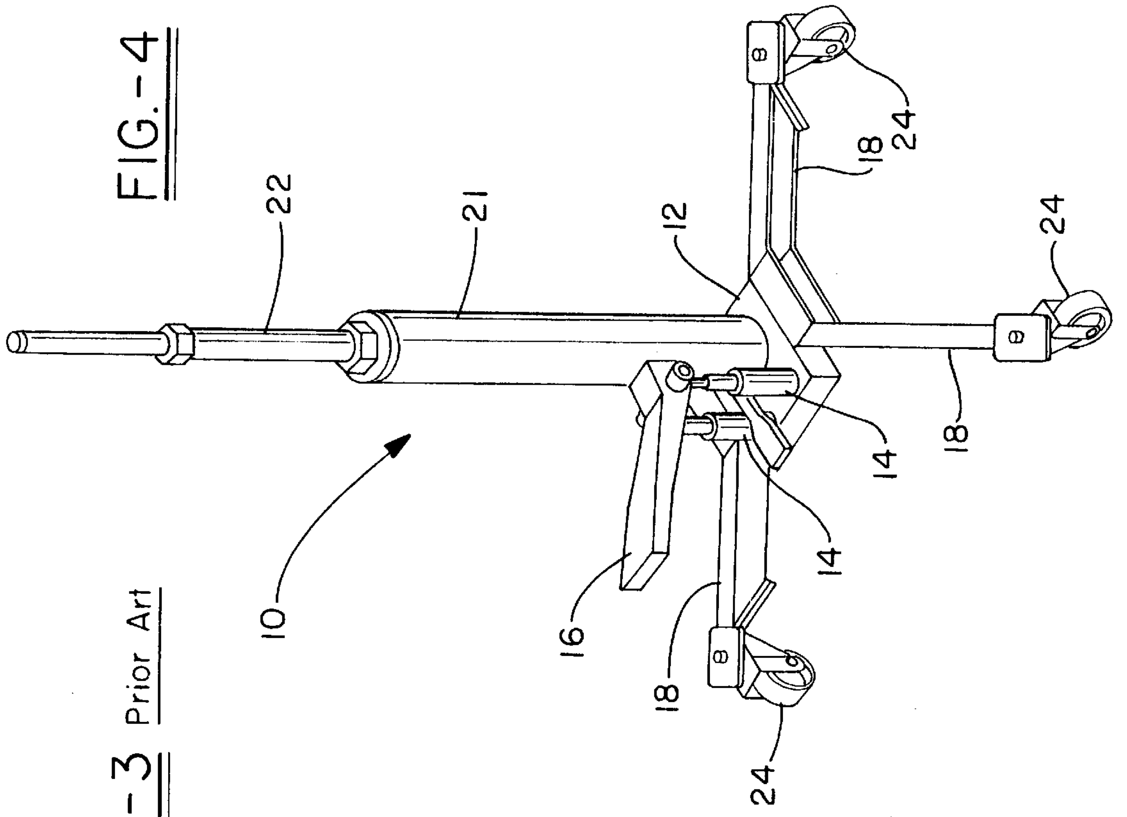
FIG. 4 is a perspective view of a jack with double pumps for lifting an automobile transmission of the present invention.
Figure 3:
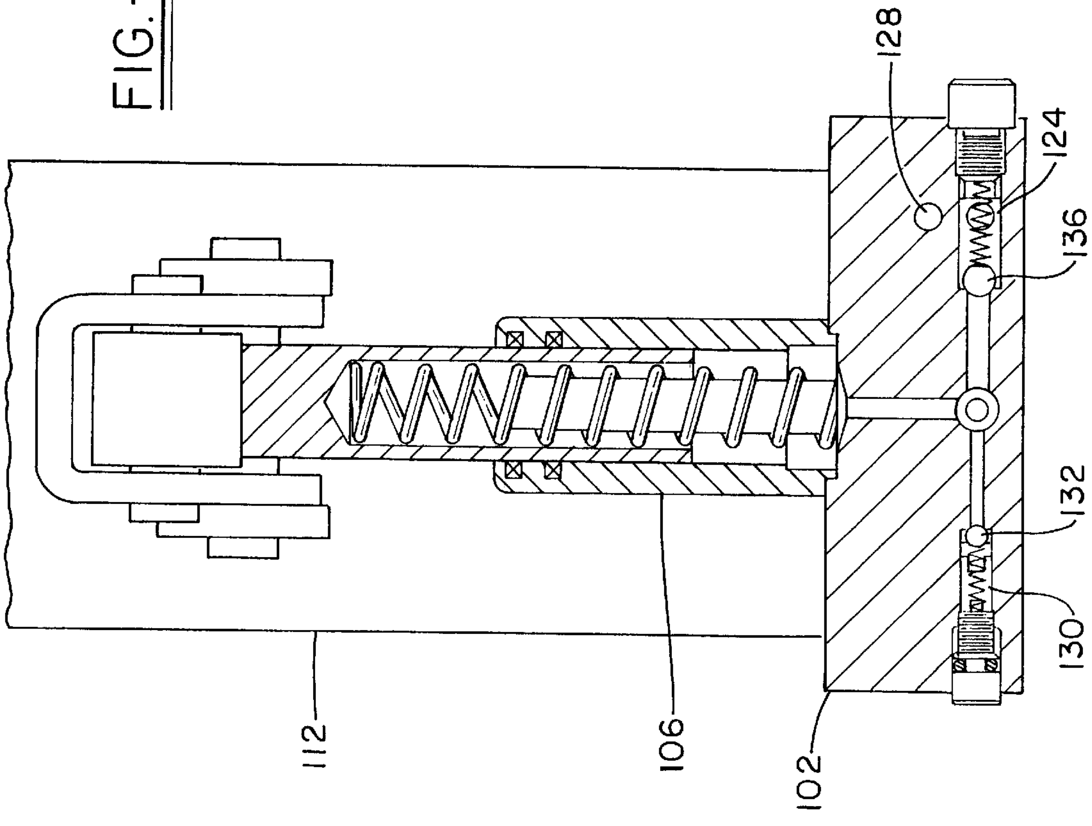
FIG.-3 Prior Art
FIG. 3 is a front cross-sectional view of the base of a conventional jack for lifting an automobile transmission.

Referring now to FIG. 4, the preferred embodiment of the present invention is an automobile transmission jack with double pumps as shown generally at 10, having a base 12, a pair of pumps 14, which are simultaneously by a pedal 16, a hydraulic oil cylinder 21 within which is a piston rod 22. Optionally, legs 18 and castors 24 can be attached to the sides of the base 12 to add stability and mobility to the jack of the present invention.

Figure 5:
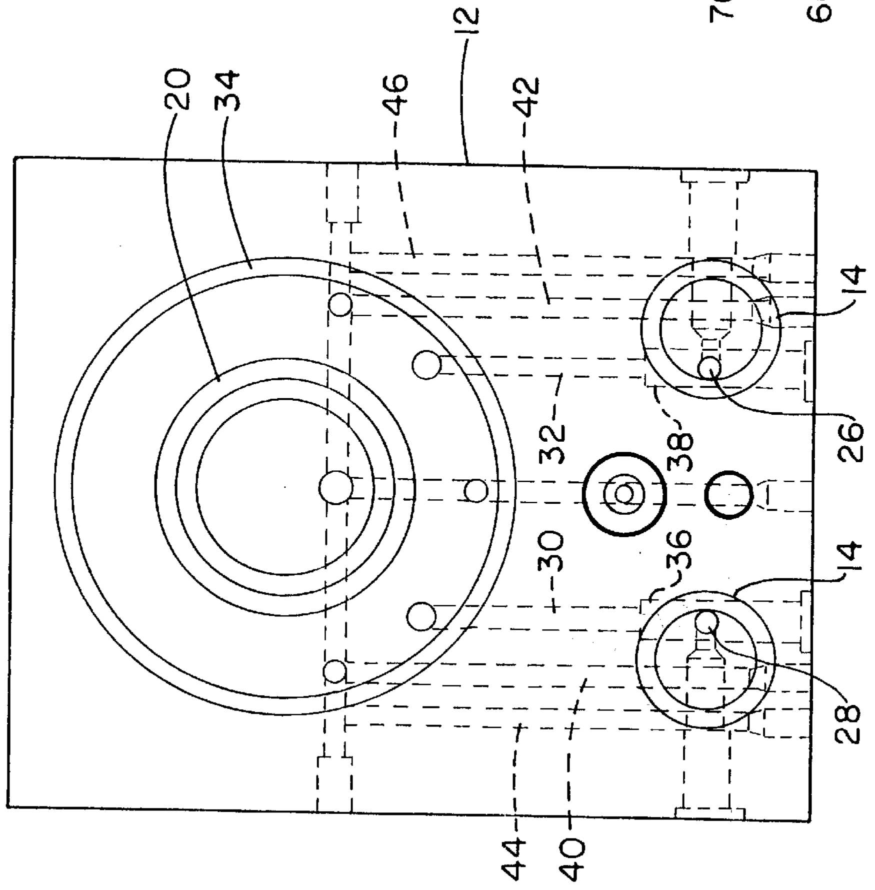
FIG. 5 is a top view of a base of the jack with double pumps for lifting an automobile transmission of the present invention.

As seen in FIG. 5, the jack has three hydraulic oil passage or conduit systems. The oil withdrawing conduits 30 and 32 connect the pumps 14 with the oil reservoir 34. The oil exit conduits 44 and 46 transfer the pumped hydraulic oil into the oil pressure cylinder 20. In the event that a load is placed on the jack which is in excess of that load which is commonly experienced for automotive transmissions or which can be easily pumped with dual pump pistons by a pump operator, i.e., loads estimated to be within a range of 350 to 500 pounds, one of the overload conduits 40 or 42 transfers the hydraulic oil back to the reservoir 34 and the other of the overload conduits transfers no hydraulic oil back to the reservoir 34. Alternatively, if a load is placed on the jack which is more than the jack is rated for, both of the overload conduits 40 and 42 transfer the hydraulic oil back to the reservoir 34. In the case where a load is placed on the jack and that load is not in excess of that which is commonly experienced for automotive transmissions or that which can be easily pumped with dual pump pistons by a pump operator, neither of the overload conduits 40 or 42 transfers oil back to the reservoir 34. Rather, hydraulic oil is transferred via both oil exit conduits 44 and 46 to the oil pressure cylinder 20. Further, the jack of the present invention has an oil release conduit 90 (not shown in FIG. 5, but seen in FIG. 8) that allows oil within the oil pressure cylinder to flow back to the reservoir 34.

Figure 6:
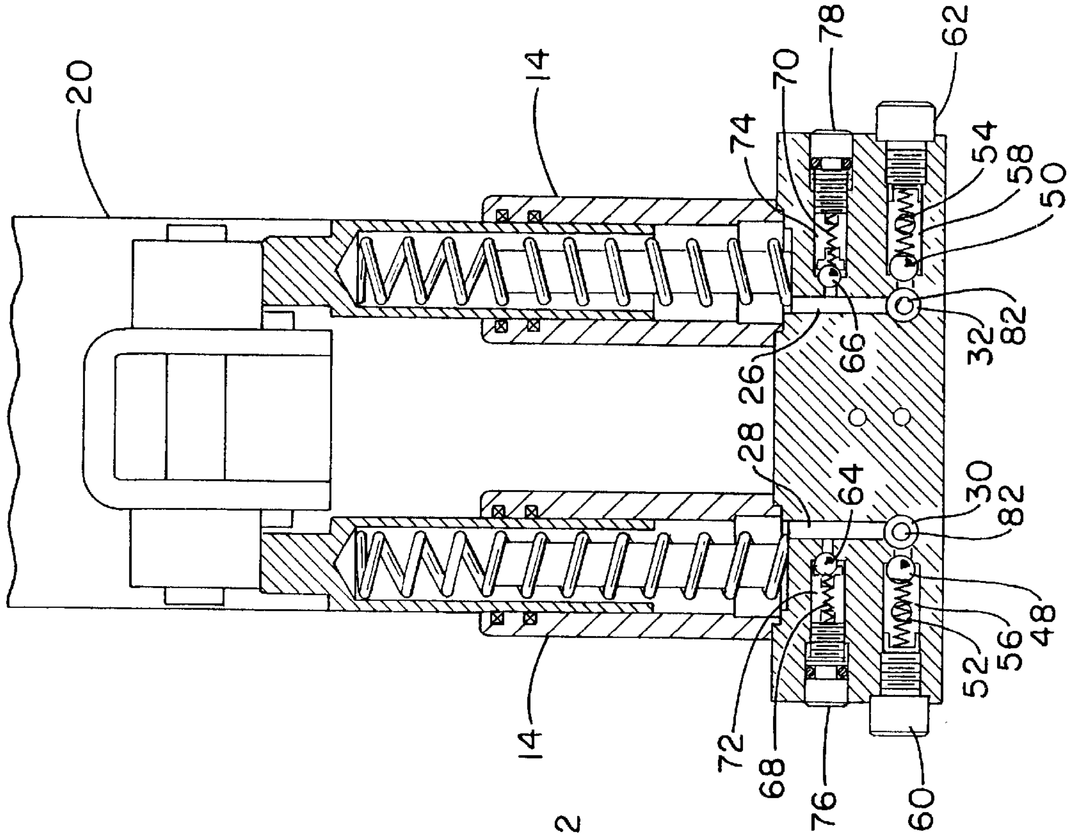
FIG. 6 is a front cross-sectional view of the base of the present invention.
Figure 10:
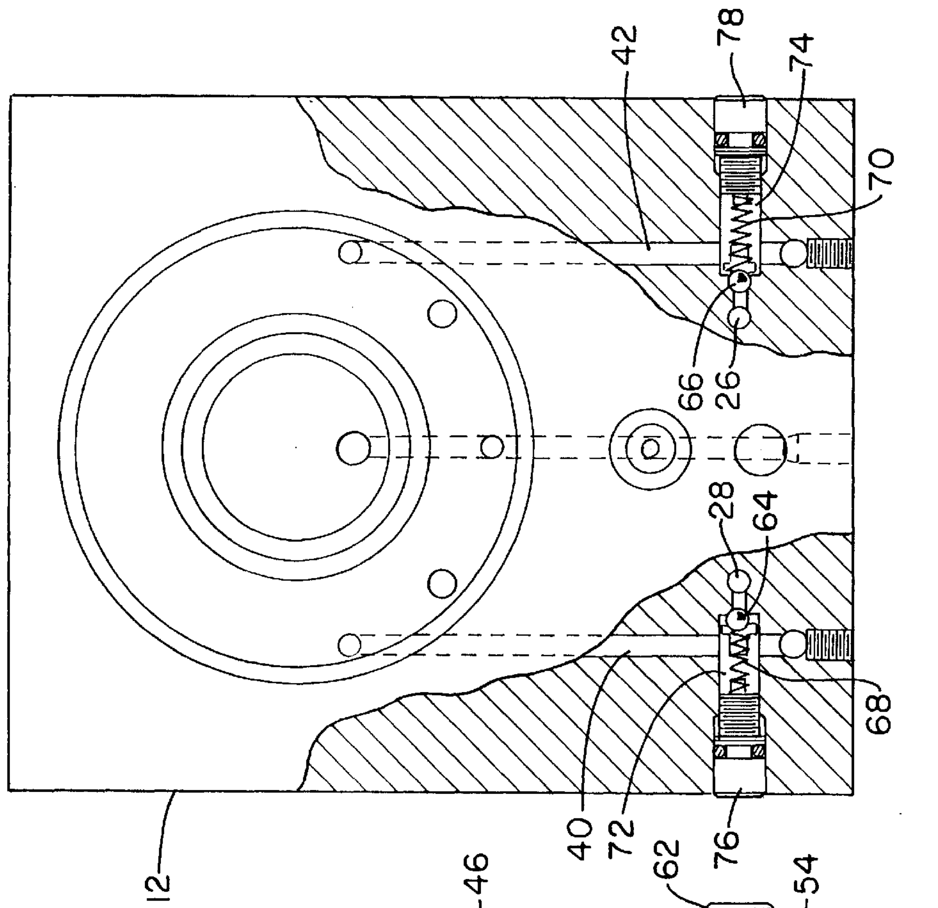
FIG. 10 is a top cross-sectional view of an overload protection route of the jack of the present invention.

As is seen in FIGS. 5 and 6, the base 12 has two holes 26 and 28 for installing the pumps in the upper surface of the base 12, two oil withdrawing conduits 30 and 32 formed respectively under the holes 26 and 28 for connecting the pumps 14 with a reservoir 22 in the hydraulic oil cylinder 20. Steel balls 48 and 50 are respectively situated within the openings 36 and 38 of the two oil exit conduits 44 and 46. Springs 52 and 54 are placed in close contact with the steel balls 48 and 50 and screws 60 and 62 are set in close contact with springs 52 and 54. Further, the oil exit conduits 44 and 46 are respectively formed at one side of the openings 36 and 38 going into the oil pressure cylinder 20 of the oil cylinder 21 as is shown in FIG. 6. Steel balls 48 and 50 are guided by springs 52 and 54 which are in turn adjusted by screws 60 and 62 within inlets 56 and 58 of oil exit conduits 44 and 46. The holes 26 and 28 are connected with the reservoir 34 by overload conduits 40 and 42 of the overload protection system as shown in FIG. 10. Now referring to FIG. 6, steel balls 64 and 66 are guided by springs 68 and 70 which are in turn adjusted by screws 76 and 78 within inlets 72 and 74 of overload conduits 40 and 42. The loads that can be placed upon the jack of the present invention such that one, both or neither of the overload conduits 40 and 42 of the overload protection system will transfer hydraulic oil back to the reservoir 34 is set by the amount of pressure that is applied by the springs 68 and 70 on steel balls 64 and 66.

In order that only one of the overload conduits 40 or 42 will transfer hydraulic oil back to the reservoir 34 while the other of the overload conduits 40 or 42 remains closed and thereby permits hydraulic oil to continue to be supplied to the oil pressure cylinder 20, one or the other of the screws 76 or 78 within inlets 72 or 74 can be adjusted so that one of the springs 68 or 70 allows one of the steel balls 64 or 66 to be moved by fluid pressure and thereby open one of the overload conduits 40 or 42 to oil flow. The other of the overload conduits can be made to remain closed by setting the screw in its respective inlet so that the steel ball also in the inlet will not be moved until a higher fluid pressure resulting from a load greater than the maximum rated load causes the ball to be moved and the overload conduit to be opened to oil flow.

Figure 8:
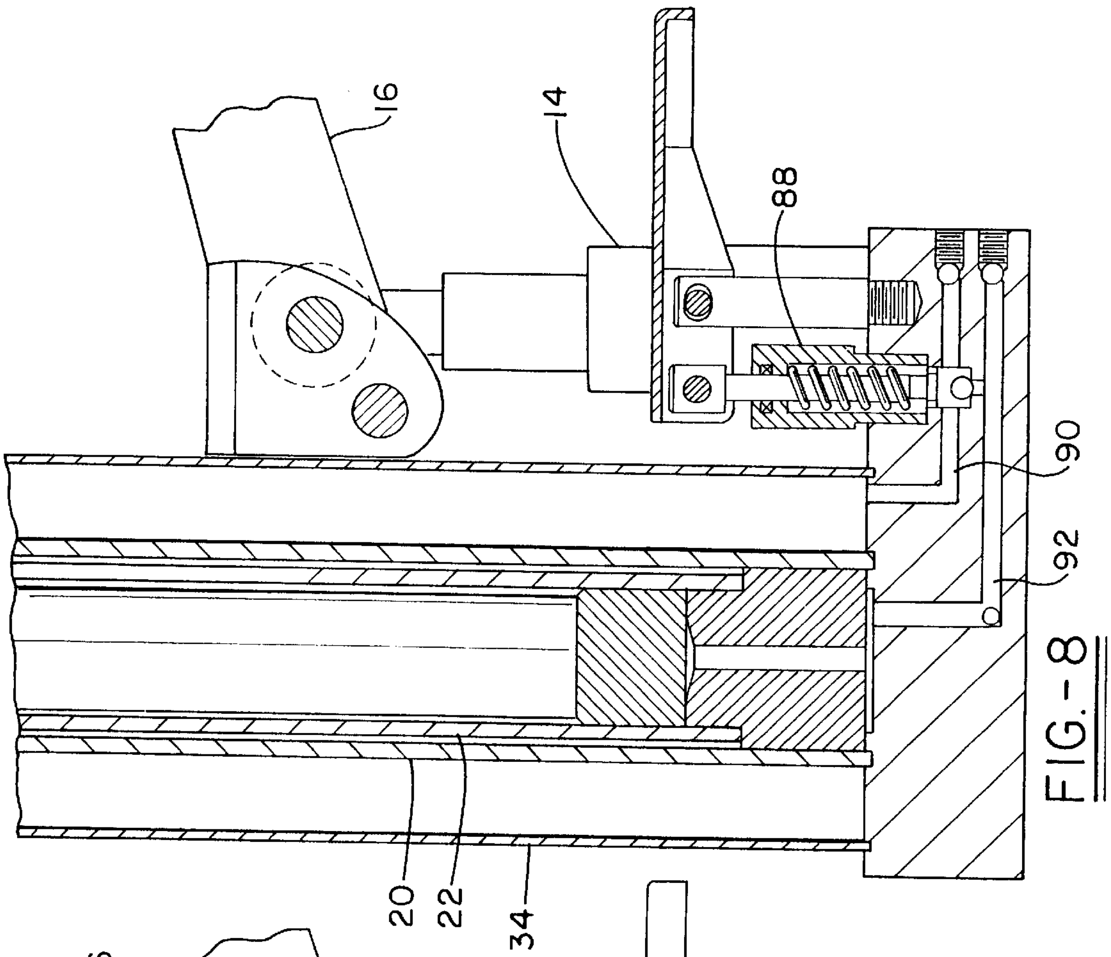
FIG. 8 is a cross-sectional view of an oil release route of the jack of the present invention.
Figure 7:
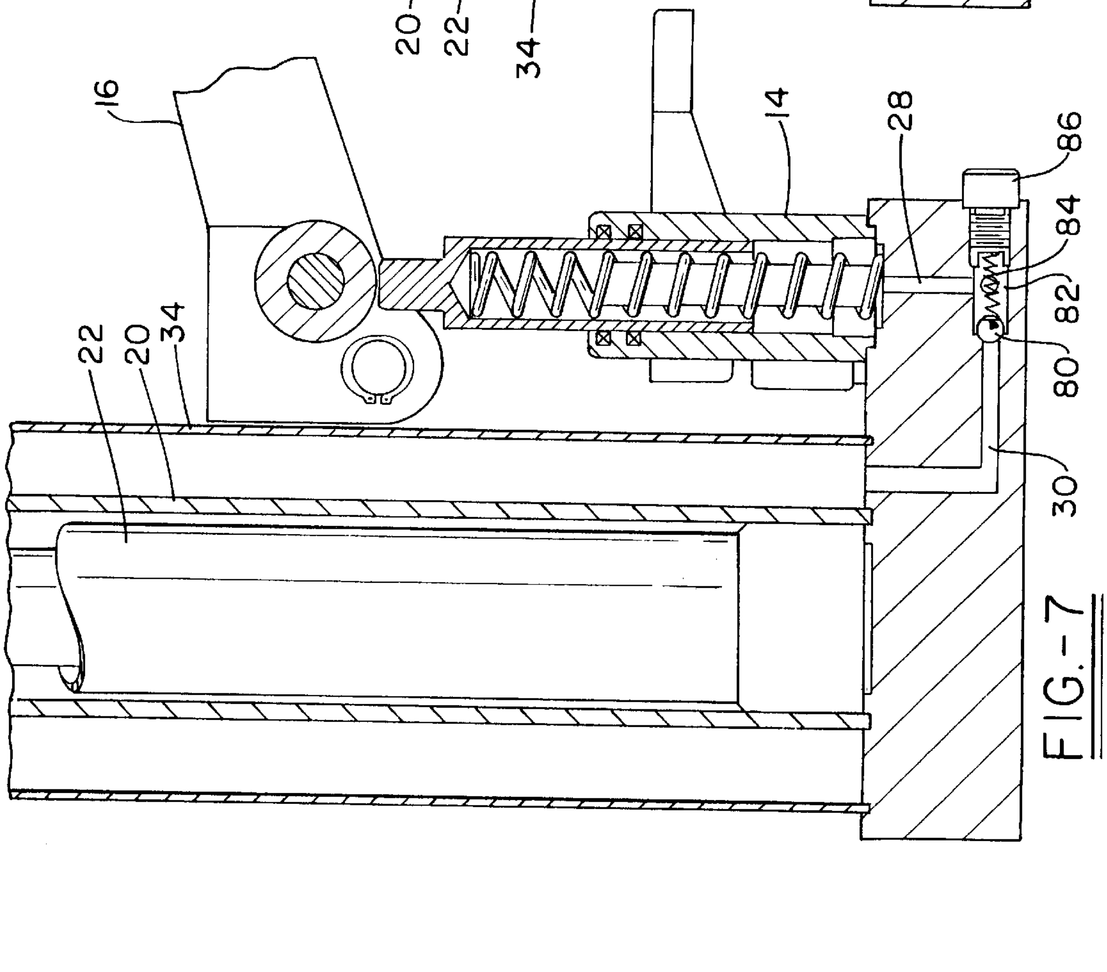
FIG. 7 is a side cross-sectional view of a jack with double pumps for lifting an automobile transmission of the present invention.
Figure 9:
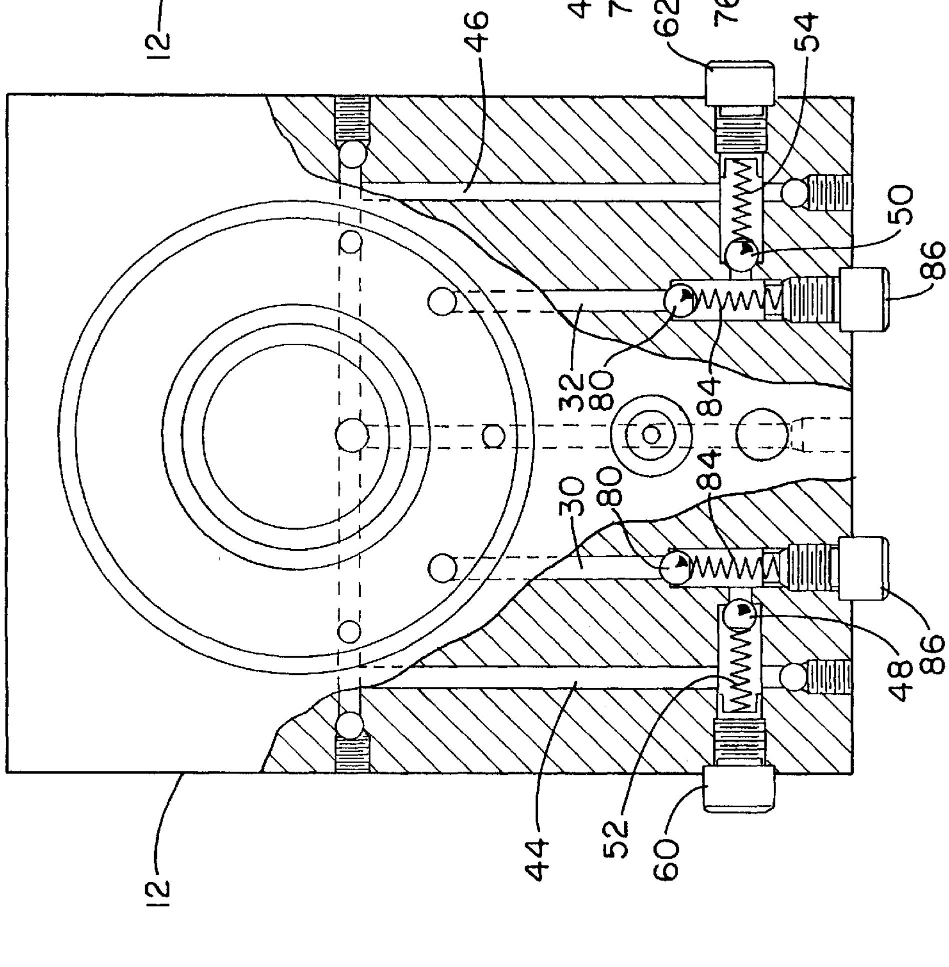
FIG. 9 is a top cross-sectional view of the oil delivering routes in the base of the jack of the present invention.

Referring now to FIG. 8, the oil release conduit 90 is formed to connect the reservoir 34 with the oil pressure cylinder 20 and is controlled by release valve 88. The pump mechanism consists of two pumps 14 and a pedal 16. The pumps 14 are fixed within two holes 26 and 28 within the base 12 with the pedal 16 resting on the upper ends of the piston rods of the pumps 14. The structure of the pumps 14 are well known in the art and details are omitted herein. In order to raise the piston rod 22 of the oil cylinder of this jack with double pumps, the pedal 16 is repeatedly pushed down to make the pumps 14 draw oil, forcing the oil in the reservoir 34 to push open the steel balls 80 in the oil withdrawing conduits 30 and 32 and flow into the oil pressure cylinder 20 so that the piston rod 22 is displaced by the hydraulic oil and raised as is shown in FIG. 9.

On the contrary, to lower the piston rod 22 in the oil pressure cylinder 20 the oil release valve 88 is engaged to connect the oil release conduit 92 with the oil exit conduit 44 and 46 permitting the oil in the pressure cylinder 20 to flow back to the reservoir 34 through the oil exit conduits 44 and 46 and the oil release conduit 92 so as to make the piston rod 22 lower to its original position.

Provided that the load on the jack is beyond the rated load, the oil delivered by stepping on the pedal 16 pushes the steel balls 64 and 66 to their open position in the conduits 40 and 42 of the overload protection system, and let oil flow back to the reservoir 34 preventing danger from happening. It is evident from the aforesaid description, that the jack of the present invention not only has a fundamental function, but also an upgrade in the operational effect by raising the piston rod of the oil cylinder at a faster rate than the conventional jack for under hoisting an automobile transmission. While the preferred embodiment of the invention has been described above, it will be recognized and understood that various modifications may be made therein and the appended claims are intended to cover all such modifications which may fall within the spirit and scope of the invention.

We claim:

1. A transmission jack comprising:

a base;

a pump mechanism attached to said base having at least two pumps and a pedal to drive said pumps;

a hydraulic cylinder mechanism attached to said base having an oil reservoir, an oil pressure cylinder and a piston within said hydraulic cylinder mechanism;

at least two oil withdrawing conduits within said base and a ball valve within each of said withdrawing conduits, said ball valve further comprising a steel ball, a spring and a screw for adjusting the point of release of the ball valve, that connect said pump mechanism to said reservoir of said hydraulic cylinder mechanism;

at least two oil exit conduits within said base and a ball valve within each of said exit conduits, said ball valve further comprising a steel ball, a spring and a screw for adjusting the point of release of the ball valve, that connect said pump mechanism to said oil pressure cylinder of said hydraulic cylinder mechanism;

at least two overload conduits within said base and a ball valve within each of said overload conduits, said ball valve further comprising a steel ball, a spring and a screw for adjusting the point of release of the ball valve, that allows oil to be returned to the reservoir;

an oil release conduit that connects said oil pressure cylinder of said hydraulic cylinder mechanism with said reservoir of said hydraulic cylinder mechanism; and a release valve situated within said oil release conduit.

2. A transmission jack as recited in claim 1, further comprising a plurality of legs attached to said base.

3. A transmission jack as recited in claim 2, wherein each leg of the plurality of legs is provided with a castor.

4. A transmission jack comprising:

a base;

a pump mechanism attached to said base having two pumps and a pedal to drive said pumps;

a hydraulic cylinder mechanism attached to said base having an oil reservoir, an oil pressure cylinder and a piston within said hydraulic cylinder mechanism;

a pair of oil withdrawing conduits, situated within said base and provided with a ball valve within each of the conduits included in said pair of oil withdrawing conduits, each of said ball valves further comprising a steel ball, a spring and a screw for adjusting the point of opening of the ball valve, said pair of oil withdrawing conduits connecting said pump mechanism to said reservoir of said hydraulic cylinder mechanism;

a pair of oil exit conduits, situated within in said base and provided with a ball valve within each of the conduits included in said pair of exit conduits, each of said ball valves further comprising a steel ball, a spring and a screw for adjusting the point of opening of the ball valve, said pair of oil exit conduits connecting said pump mechanism to said oil pressure cylinder of said hydraulic cylinder mechanism;

a pair of overload conduits, situated within said base and provided with a ball valve within each of the conduits included in said pair of overload conduits, each of said ball valves further comprising a steel ball, a spring and a screw for adjusting the point of opening of the ball valve, said pair of overload conduits connecting said oil reservoir to said oil pressure cylinder and allowing oil to be returned to the reservoir if either or both of the ball valves included in the pair of ball valves provided in said pair of overload conduits is open;

an oil release conduit that connects said oil pressure cylinder of said hydraulic cylinder mechanism with said reservoir of said hydraulic cylinder mechanism; and a release valve situated within said oil release conduit.

5. A transmission jack as recited in claim 4, wherein the screw of one of the ball valves included in the pair of ball valves provided in said pair of overload conduits is adjusted so that the ball valve in which the screw is situated will open at a first fluid pressure and the screw of the other of the ball valves included in the pair of ball valves provided in said pair of overload conduits is adjusted so that the ball valve in which the screw is situated will open at a second fluid pressure, said first fluid pressure being lower than said second fluid pressure.

6. A transmission jack as recited in claim 5, wherein said first fluid pressure corresponds to that which is produced when a load having a weight within a range of approximately 350 to 500 pounds is on said jack and further wherein said second fluid pressure corresponds to that which is produced when a load having a weight in excess of 1,000 pounds is on the jack.

* * * * *